United States Patent

Kubota et al.

[11] 4,115,290
[45] Sep. 19, 1978

[54] MAGNETIC RECORDING MEDIUM

[75] Inventors: Yuichi Kubota; Norifumi Kajimoto, both of Tokyo, Japan

[73] Assignee: TDK Electronics Co., Ltd., Tokyo, Japan

[21] Appl. No.: 790,914

[22] Filed: Apr. 26, 1977

[51] Int. Cl.² .......................... H01F 1/00; B23B 15/00
[52] U.S. Cl. .................................................. 252/62.54
[58] Field of Search ........................... 252/62.54, 62.53

[56] References Cited

U.S. PATENT DOCUMENTS

| 3,810,840 | 5/1974 | van Ruler et al. | 252/62.54 |
| 3,824,128 | 7/1974 | Akashi et al. | 252/62.54 X |
| 4,002,804 | 1/1977 | Akashi et al. | 428/539 |

Primary Examiner—F.C. Edmundson
Attorney, Agent, or Firm—Oblon, Fisher, Spivak, McClelland & Maier

[57] ABSTRACT

A magnetic recording medium is prepared by preparing a nitrocellulose-based magnetic composition by kneading a magnetic powder with a mixture of nitrocellulose in a solvent system containing isopropyl alcohol and blending the kneaded mixture with a polyurethane containing unreacted isocyanate groups; coating a substrate with the resulting magnetic composition and allowing the coated substrate to dry. The improvement comprises replacing substantial portions of the isopropyl alcohol from the group consisting of polyurethane resins, polybutadiene resins, butadiene-acrylonitrile copolymers, vinyl chloride-vinyl acetate-vinyl alcohol copolymers, vinyl chloride-vinyl acetate copolymers, vinyl chloride-vinylidene chloride copolymers, vinylidene chloride-acrylonitrile copolymers, vinyl acetate resins, epoxy resins, phenoxy resins, polyvinyl butyral resins, polyvinyl formal resins and polyester resins.

12 Claims, 2 Drawing Figures

MAGNETIC RECORDING MEDIUM

BACKGROUND OF THE INVENTION

The present invention relates to a magnetic recording medium.

Magnetic recording media prepared by coating a composition of a magnetic power and a binder on a substrate such as a plastic film e.g. a polyester film or an aluminum desk have been used in the past. Various binders have been proposed for these megnetic recording media. However, a completely suitable binder for use in the preparation of media has not been found. A nitrocellulose composition has been used as the binder because of its excellent wetting and excellent levelling characteristics in the preparation of a magnetic composition. However, nitrocellulose is flammable and precautions against fire must be taken during handling so that as a regulation, from 30 to 35 wt. % of isopropyl alcohol is blended with nitrocellulose to prevent explosions caused by fine particles dusts of nitrocellulose in the air. By this technique the safe handling and storage of nitrocellulose can be achieved.

When nitrocellulose is used as a binder for magnetic tapes the wear resistance and electromagnetic characteristics of the tape can be improved because of improved affinity between the binder and the magnetic powder and improved mechanical strength of the binder when a polyurethane is combined with nitrocellulose. In this instance a cross-linked structure is formed by reaction of hydroxyl groups in the nitrocellulose with isocyanate groups in the polyurethane. However, the isopropyl alcohol which is always present with the nitrocellulose interfers with the cross-linking reaction because isopropyl alcohol itself reacts with the isocyanate groups. Because the isopropyl alcohol interfers with the cross-linking reaction, the improved degree of wear resistance of the recording medium and running friction characteristics sought cannot be attained. These problems are discussed in U.S. Pat. No. 3,808,136 and U.S. Pat. No. 3,810,840.

In order to overcome these disadvantages, it has been proposed to improve the physical characteristics of the binder composition by blending and kneading the nitrocellulose composition with about 15 wt. % of a plasticizer such as dibutyl phthalate or dioctyl phthalate based on the solid component in a kneader and then vaporizing the isopropyl alcohol which is present in the nitrocelluous on a hot two roll-mill to prepare nitrocellulose composition chips in which the isopropyl alcohol is replaced by the plasticizer. The chips are then mixed with a polyurethane and mixing a crosslinking agent having active isocyanate groups so that the isocyanate groups can effectively react with the main binder components. However, the video tapes prepared by using such a binder have the disadvantages that troubles are encountered during running of the product tape or creaking sounds are heard which are caused by increased friction during running of the tape when it is used for a VTR. Moreover, the magnetic coating peels from the head in severe test for friction of the magnetic coating such as in steal reproduction tests for reproducing the same track to obtain a stationary image when the tape is stopped. This adverse effect results from the presence of the plasticizer such as dibutyl phthalate in the magnetic coating.

SUMMARY OF THE INVENTION

It is an object of the present invention to provide a magnetic recording medium which does not have the above-mentioned disadvantages.

The foregoing and other objects of the present invention have been attained by providing a magnetic recording medium having a magnetic coating which comprises a nitrocellulose composition obtained by replacing isopropyl alcohol with a resin, wherein said nitrocellulose is corsslinked with isocyanate groups from a urethane compound.

DETAILED DESCRIPTION OF THE PREFERRABLE EMBODIMENTS

Figure 1:
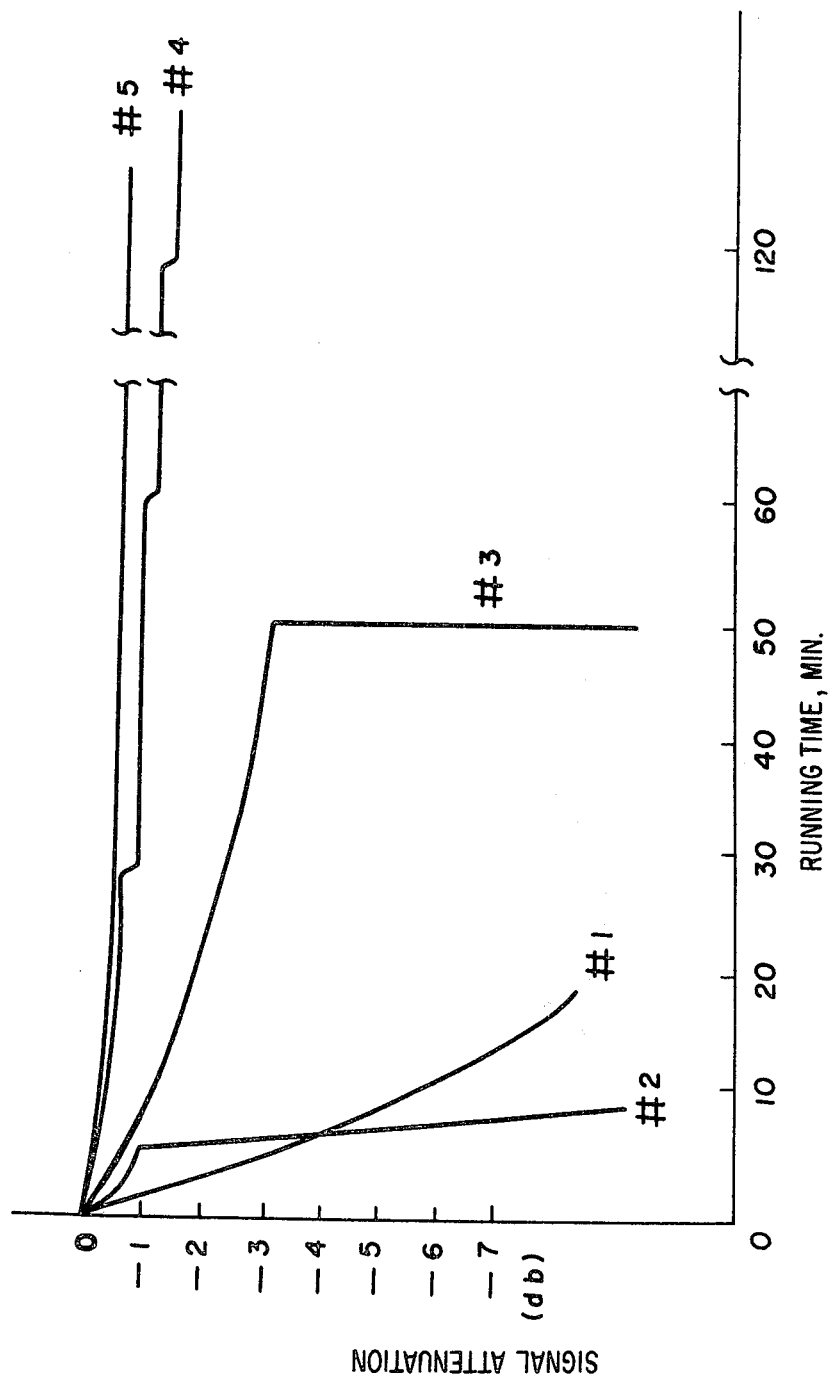

A nitrocellulose composition which contain isopropyl alcohol is blended and kneaded with a resin which can be used for the magnetic coating and then isopropyl alcohol is removed thereby replacing the isopropyl alcohol with the resin. The resulting nitrocellulose composition comprises nitrocellulose and the resin. It is preferable to use a vinyl chloride type resin to prevent combustion.

The nitrocellulose composition is usually dissolved in a solvent such as methylethylketone or methylisobutylketone with a suspending agent such as lecithin and a magnetic power such as acicular $\gamma\text{-Fe}_2O_3$ or a Co-containing iron oxide powder and carbon black are dispersed in the solution by kneading. The amount of magnetic powder and carbon black used are within the conventional quantities used in such applications.

The mixture is blended with a polyurethane solution. The polyurethane solution includes a polyurethane resin and a solvent with suitable additives. Abrasive powders such as $CrO_2$, $Cr_2O_3$, $ZrO_2$, $Ce_2O_3$, SiC, $\alpha\text{-Fe}_2O_3$, $Al_2O_3$, and $TiO_2$ can be added to improve the characteristics of the product.

A urethane compound having two or more isocyanate groups is added to the mixture to cross-link the nitrocellulose. The amount of the urethane compound chosen is an amount sufficient to cross-link nitrocellulose. The resulting magnetic composition is coated on a tape or a plate to prepare a magnetic recording medium. The invention will be further illustrated by examples.

| Preparation of Nitrocellulose Composition: | |
|---|---|
| Nitrocellulose chips (H½ second) (isopropyl alcohol content 30 %) | 10 Kg |
| Vinyl chloride-vinyl acetate copolymer (VAGH manufactured by VCC) | 3 Kg |
| Methyl ethyl ketone | 2 Kg |

The components were well kneaded by a kneader at room temperature for 30 minutes to mix nitrocellulose and vinyl chloride-vinyl acetate copolymer. The mixture obtained from the kneader was further kneaded. By passing it through a hot, two roller mill at 40° C. several times whereby nitrocellulose and vinyl chloride-vinyl acetate copolymer were completely mixed and isopropyl alcohol and methyl ethyl ketone were vaporized thereby forming a sheet of the composition. An analyser of the sheet showed that it contained measured to give 87. 5 wt. % solids , 6.5 wt. % of isopropyl alcohol and 6 wt. % methyl ethyl ketone. The sheet was dried with blown air at room temperature for 10 days to vaporize the residual solvents. The sheet contained 96.5 wt. % solids, 2wt. % isopropyl alcohol and 1wt. % methylethylketone. The sheet was pulverized into chip form and the chips were processed for use as a binder for a magnetic recording medium.

From the viewpoint of fire safety in the kneading operation by use of the roller mill, the nitrocellulose content of the chips is preferably less than 80 wt. % and the vinyl chloride-vinyl acetate copolymer content is preferably more than 20 wt. %. In this example, isopropyl alcohol was replaced by vinyl chloride-vinyl acetate copolymer. Thus, it was confirmed that the same results could be attained by using resins which are usually used for the preparation of magnetic recording media such as polyurethane resins; polybutadiene resins, butadiene-acrylonitrile copolymers, vinyl chloride-vinyl acetate-vinyl alcohol copolymers; vinyl chloride-vinyl acetate copolymer; vinyl chloride-vinylidene chloride copolymers, vinylidene chloride-acrylonitrile, vinyl acetate resins, epoxy resins, phenoxy resins, polyvinyl butyral resins, polyvinyl formal resins and polyester resins.

It is especially preferable to use vinyl chloride type resins from the viewpoint of safety during processing and handling of the nitrocellulose because the flammability of the nitrocellulose can be reduced by incorporating vinyl chloride type resins into the nitrocellulose. Each of the following magnetic tapes was prepared by using nitrocellulose chips produced by replacing isopropyl alcohol a resin or a plasticizer or the non-treated nitrocellulose was used and the characteristics of the magnetic tapes were compared.

| Reference 1: | | |
|---|---|---|
| $\gamma$-Fe$_2$O$_3$ (0.8$\mu$; 0.2$\mu$) | 120 | wt. parts |
| Carbon black | 6 | " |
| Lecithin | 2 | " |
| Nitrocellulose (H½ second) (isopropyl alcohol content 30 %) | 22 | " |
| Methyl ethyl ketone | 50 | " |
| Methyl isobutyl ketone | 50 | " |

Nitrocellulose, lecithin, methyl ethyl ketone, methyl isobutyl ketone were throughly mixed in a mixer to dissolve the solid components. The paste was charged into a ball mill together with $\gamma$-Fe$_2$O$_3$ and carbon black and the mixture was throughly mixed for 3 hours to wet the particles.

| | | |
|---|---|---|
| Polyurethane resin (solid content 45 wt. %) | 33 | wt. parts |
| Methyl ethyl ketone | 200 | " |
| Methyl isobutyl ketone | 100 | " |
| Lubricant (silicon oil) | 3 | " |

Figure 2:
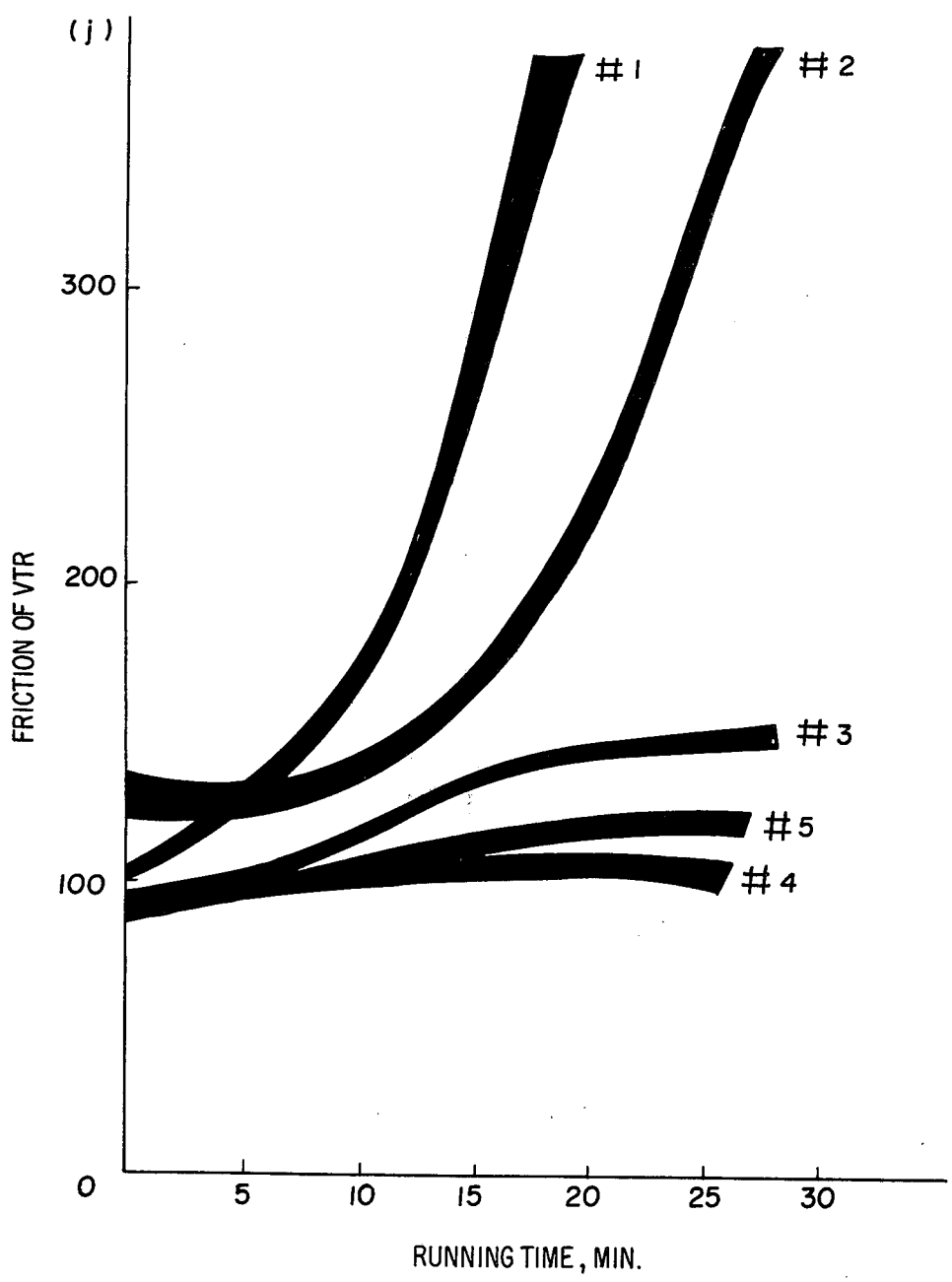

The components were throughly mixed to dissolve the solid components and the paste was charged into the ball mill containing $\gamma$-Fe$_2$O$_3$. The mixture was throughly mixed for 42 hours to disperse the particles. After the dispersing operation, 5 parts by weight of isocyanate which is reactable with the hydroxy functional groups of the binder of the magnetic composition, were added to the mixture in the ball mill to effect the desired cross-linking and the mixture was mixed for 20 minutes. The resulting magnetic composition was coated on a polyester film to form a magnetic tape. After the surface processing of the magnetic tape, the thermosetting reaction of the magnetic coating was effected by heating it at 80° C. for 48 hours. The resulting magnetic tape was cut to a width of one-half inch to obtain a video tape. The characteristics of the video tape as sample No. 1 are shown in FIGS. 1 and 2. Signals were recorded on the video tape by video tape recorder (VTR) (EIAJ — I type standard) (NV-3120 manufactured by Matsushita Denki). The signal were reproduced in a stationary condition under a tension of 200 g$\gamma$ to the winding side by a spring measurement. FIG. 1 shows the relationship of the attenuation of the reproduced signal versus time.

As it is clear from FIG. 1, the attenuation of the reproduced signal was very large because the isocyanate reacted with the isopropyl alcohol in the nitrocellulose used for plasticizing nitrocellulose and the satisfactory cross-linked structure of the magnetic coating was not attained. Accordingly the magnetic coating was not durable against severe wearing during steal reproduction and the magnetic coating on which the signal was recorded was scraped by friction with the head of the recorder at a rate of 11 m/second. The magnetic tape was stored for 5 days under 5 cycles of atmosphere conditions varying from $-10°$ C. with 0% relative humidity to 60° C. with 80° C. of relative humidity, and it was further stored for 24 hours at room temperature, and then the magnetic tape was run by the VTR used for the measurement of the signal attenuation, and a tension analyzer (1VA-500 type manufactured by Nippon Jidoseigyo) was set between the head drum and the pinchroller to measure the variation of tension in the wind-up side while the tape was run. FIG. 2 shows the relationship of the variation of tension versus the running time. As is clear from FIG. 2, the tendency toward increased friction depends upon the running time.

| Reference 2: | | |
|---|---|---|
| Co containing iron oxide (0.6$\mu$; 0.06$\mu$) | 120 | wt. parts |
| Carbon black | 6 | " |
| Lecithin | 2 | " |
| Nitrocellulose pellets (H½ second) (12 % of isopropyl alcohol was replaced) (to 12 % of dibutyl phthalate;) (pellet form) | 18.3 | " |
| Methyl ethyl ketone | 50 | " |
| Methyl isobutyl ketone | 50 | " |

The nitrocellulose pellets, lecithin, methylethylketone and methylisobutylketone were throughly mixed by a mixer to dissolve the solid components. The paste was charged into a ball mill together with the Co containing iron oxide and carbon black and the mixture was throughly mixed to wet the particles.

| | | |
|---|---|---|
| Polyurethane resin | 15 | wt. parts |
| Methyl ethyl ketone | 200 | " |
| Tetrahydrofuran | 100 | " |
| Lubricant (butyl myristate) | 3 | " |

The components were mixed to dissolve the solid components and the paste was charged into a ball mill containing the Co containing iron oxide, etc. and the mixture was throughly mixed for 42 hours to disperse the particles. After the dispersing process, 5 parts by weight of isocyanate which is reactable with the hydroxyl functional groups in the binder of the magnetic composition were added to the ball mill and the mixture was mixed for 20 minutes. The resulting magnetic composition was coated on a polyester film to form a magnetic tape. After the surface processing of the magnetic tape, the thermosetting reaction of the magnetic coating was effected by heating it at 80° C. for 48 hours.

The magnetic tape was cut into a width of one-half inch to obtain a video tape. The characteristics of the video tape as sample No. 2 were measured to show in FIGS. 1 and 2.

As is clear from FIG. 1, the signal attenuation as a function of running time was large because the dibutyl phthalate plasticizer deterioration of the lubricating effect at high relative speeds for the steal reproduction even though the nitrocellulose contained dibutyl phthalate instead of isopropyl alcohol and greater cross-linking of the magnetic coating resulted by the reaction of the isocyanate to give a higher strength magnetic coating. As is clear from the results of FIG. 2, the tendency toward increased friction versus an increase in running time was very high.

EXAMPLE 1

| Co containing iron oxide | 120 | wt. parts |
|---|---|---|
| (0.6μ; 0.06μ) | | |
| Carbon black | 6 | " |
| Lecithin | 2 | " |
| Nitrocellulose chips | 15 | " |
| (H½ second) | | |
| (30 % of isopropyl alcohol was replaced to) | | |
| (30 % of vinyl chloride-vinyl acetate copolymer) | | |
| (70 % nitrocellulose) | | |
| Methyl ethyl ketone | 50 | " |
| Methyl isobutyl ketone | 50 | " |

The nitrocellulose chips, lecithin, methyl ethyl ketone and methyl isobutyl ketone were throughly mixed by a mixer to dissolve the solid components. The paste was charged into a ball mill together with the Co containing iron oxide and carbon black and the mixture was throughly mixed to wet the particles.

| Polyurethane resin | 15 | wt. parts |
|---|---|---|
| Methyl ethyl ketone | 200 | " |
| Tetrahydrofuran | 100 | " |
| Lubricant (butyl myristate) | 3 | " |

The components were mixed to dissolve the solid components and the paste was charged into a ball mill containing the Co containing iron oxide etc. and the mixture was throughly mixed for 42 hours to disperse the particles. After the dispersing process, 5 parts by weight of isocyanate which is reactable with the hydroxy functional (groups in the binder of the magnetic composition, were added to the ball mill and the mixture was mixed for 20 minutes. The resulting magnetic composition was coated on a polyester film to form a magnetic tape. After the surface processing of the magnetic tape, the thermosetting reaction of the magnetic coating was effected by heating it at 80° C. for 48 hours. The magnetic tape was cut to a width of one-half inch to obtain a video tape. The characteristics of the video tape as sample No. 3 were measured as shown in FIGS. 1 and 2. As is clear from FIG. 1, the signal attenuation versus running time was small and the wear resistance of the magnetic coating was improved in comparison to sample No. 2 because isopropyl alcohol in the nitrocellulose was removed and the isocyanate effectively reacted with the polyurethane resin in the crosslinking reaction to form a magnetic coating on high strength.

As is clear from FIG. 2, the magnetic tape possessed stable running characteristics even though the test was carried out by running the tape through the VTR after storage under severe conditions. This fact shows that the binder is suitable for preparing magnetic tape having a high reliability.

The polyurethane resin must have an average molecular weight of $10^3$ to $10^6$ from the viewpoint of solubility and physical properties.

EXAMPLE 2

| Co containing iron oxide | 12 | wt. parts |
|---|---|---|
| (0.6μ; 0.06μ) | | |
| Carbon black | 6 | " |
| Lecithin | 2 | " |
| Nitrocellulose pellets | 15 | " |
| H-½ second | | |
| nitrocellulose: vinyl chloride-vinyl acetate-vinyl alcohol copolymer (VYNC) = 60 : 40 which was produced from 30 % isopropyl alcohol containing nitrocellulose and 40 % solution of VYNC in isopropyl acetate | | |
| Methyl ethyl ketone | 50 | " |
| Methyl isobutyl ketone | 50 | " |

The nitrocellulose pellets, lecithin, methylethylketone, and methylisobutylketone were throughly mixed in a mixer to dissolve the solid components. The paste was charged into a ball mill together with the Co containing iron oxide and carbon black and the mixture was throughly mixed to wet the particles.

| Polyurethane resin | 33 | wt. parts |
|---|---|---|
| Methyl ethyl ketone | 200 | " |

The components were mixed to dissolve the solid components and the paste was charged into a ball mill containing the Co containing iron oxide etc. and the mixture was throughly mixed for 42 hours to disperse the particles. After the dispersing process, 5 parts by weight of isocyanate which is reactable with the hydroxyl functional groups in the binder of the magnetic composition, were added to the ball mill and the mixture was mixed for 20 minutes. The resulting magnetic composition was coated on a polyester film to form a magnetic tape. After the surface processing of the magnetic tape, the thermosetting reaction of the magnetic coating was effected by heating it at 80° C. for 48 hours. The magnetic tape was cut to a width of one-half inch to obtain a video tape. The characteristics of the video tape as sample No. 4 were measured as shown in FIGS. 1 and 2. As is clear from FIG. 1, the sealing characteristics had remarkably improved because the strength of the magnetic coating and the wear resistance of the magnetic coating were improved by the addition of fine very hard abrasive particles. As is clear from FIG. 2, the magnetic tape had running characteristics as stable as those of sample No. 3.

In the example, $Cr_2O_3$ was used as the abrasive. However, other abrasives such as $ZrO_2$, $Co_2O_3$, $Al_2O_3$, $TiO_2$ can be substituted for $Cr_2O_3$. Thus, the effect of the abrasive is not attained without using the abrasive particles having an average diameter of 5 to 0.05μ. When the content of the abrasive is less than 0.5 wt. %. to the magnetic powder, the effect of the abrasive is not attained whereas when the content of the abrasive is more than 15 wt. %, undesirable wearing results. The content of the abrasive must be within the range of 0.5 to 15 wt. % to the magnetic powder.

EXAMPLE 3

In accordance with the process of Example 2, the magnetic tape was prepared by adding 1 wt. % of butyl myristate as lubricant in the mixing of the polyurethane resin and the abrasive. The characteristics of the video tape as sample No. 5 were measured as shown in FIGS. 1 and 2. As is clear from FIG. 1, the signal attenuation was less than 1 db during steal reproduction for longer than 24 hours because the lubrication for the relative friction between the tape and the head at high speed was attained by the presence of butyl myristate together with high strength of the magnetic coating and the wear resistance by the abrasive.

As is clear from FIG. 2, the magnetic tape had running characteristics as stable as those of sample No. 3. In the example, butyl myristate was added as the lubricant. It is possible to use other lubricants as replacements such as straight chain saturated aliphatic acid esters having the formula $C_nH_{2n}COOC_mH_{2m+1}$ ($n=12$ to 22 and $m=1$ to 8). The content of the lubricant should be within the range of 0.5 to 20 wt. parts per 100 wt. parts of the binder from the viewpoint of wear resistance. The nitrocellulose composition and the magnetic recording medium prepared by using it are remarkably superior to the conventional products.

What is claimed is:

1. A magnetic recording medium which comprises: a magnetic coating on a substrate, said magnetic coating comprising a magnetic powder in a binder of nitrocellulose in which the isopropyl alcohol originally present has been replaced by a resin selected from the group consisting of polyurethane resins, polybutadiene resins, butadiene-acrylonitrile copolymers, vinyl chloride-vinyl acetate-vinyl alcohol copolymers, vinyl chloride-vinyl acetate copolymers, vinyl chloride-vinylidene chloride copolymers, vinylidene chloride-acrylonitrile copolymers, vinyl acetate resins, epoxy resins, phenoxy resins, polyvinylbutyral resins, polyvinyl formal resins and polyester resins, and which is cross-linked by reactive isocyanate groups in a polyurethane material blended with said alcohol free nitrocellulose binder.

2. The medium of claim 1, wherein said magnetic powder is acicular $\gamma$-$Fe_2O_3$ or Co-containing iron oxide.

3. The medium of claim 1, wherein the amount of resin relative to nitrocellulose is more than 20 wt. %.

4. The method of claim 1, wherein said resin is a vinyl chloride-vinyl acetate-vinyl alcohol resin.

5. The medium of claim 1, wherein said isocyanate group containing polyurethane resin has an average of molecular weight of $10^3$ to $10^6$.

6. The medium of claim 1, wherein said magnetic coating further comprises from 0.5 to 15 wt. % relative to said magnetic powder of an abrasive powder having an average diameter of 5 to 0.5 82 m.

7. The medium of claim 1, wherein said magnetic coating further comprises an abrasive powder selected from the group consisting of $CrO_2$, $Cr_2O_3$, $ZrO_2$, $Ce_2O_3$, SiC, $\alpha$-$Fe_2O_3$, $Al_2O_3$, and $TiO_2$.

8. The medium of claim 1, which further comprises a lubricant.

9. The medium of claim 8, wherein said lubricant is a straight chain saturated aliphatic acid having the formula:

$$C_nH_{2n+1}COOC_mH_{2m+1}$$

wherein $n$ ranges from 12 to 22 and $m$ ranges from 1 to 8, in an amount of 0.5 to 20 parts by weight per 100 parts by weight total of said nitrocellulose and said isocyanate group containing polyurethane.

10. The method of claim 5, wherein the resin is a vinyl chloride-vinyl acetate resin.

11. The method of claim 6, wherein the resin is a vinyl chloride-vinyl acetate resin.

12. The method of claim 9, wherein the resin is a vinyl chloride resin.

* * * * *

UNITED STATES PATENT AND TRADEMARK OFFICE
CERTIFICATE OF CORRECTION

PATENT NO. : 4,115,290

DATED : September 19, 1978

INVENTOR(S) : Yuichi Kubota et al

It is certified that error appears in the above-identified patent and that said Letters Patent are hereby corrected as shown below:

Please insert the following Priority Information:

[30]   May 24, 1976   Japan................51-59084

*Signed and Sealed this*

*Twenty-fourth* Day of *April 1979*

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,115,290
DATED : September 19, 1978
INVENTOR(S) : YUICHI KUBOTA ET AL It is certified that error appears in the above–identified patent and that said Letters Patent are hereby corrected as shown below:

Column 7, line 20, delete "$C_nH_{2n}COOC_mH_{2m+1}$" and insert --$C_nH_{2n+1}COOC_mH_{2m+1}$--.

Column 8, line 17, delete "5 to 0.582 m." and insert --5 to 0.05 µ--.

Signed and Sealed this

Twenty-seventh Day of November 1979

[SEAL]

Attest:

RUTH C. MASON
*Attesting Officer*

LUTRELLE F. PARKER
*Acting Commissioner of Patents and Trademarks*